Nov. 30, 1965     D. M. BOSTWICK     3,220,623
MOTORCYCLE CAMPING PACK SUPPORT

Filed Nov. 1, 1963     2 Sheets-Sheet 1

Deward M. Bostwick
INVENTOR.

Nov. 30, 1965  D. M. BOSTWICK  3,220,623
MOTORCYCLE CAMPING PACK SUPPORT
Filed Nov. 1, 1963  2 Sheets-Sheet 2

Deward M. Bostwick
INVENTOR.

United States Patent Office 3,220,623
Patented Nov. 30, 1965

3,220,623
MOTORCYCLE CAMPING PACK SUPPORT
Deward M. Bostwick, 4948 W. 78th St., Oaklawn, Ill.
Filed Nov. 1, 1963, Ser. No. 320,811
5 Claims. (Cl. 224—32)

This invention relates to a novel and useful motorcycle camping pack support and more specifically to a support assembly adapted to be secured to and supported from the rearwardly projecting pair of arms of a motorcycle main frame between which the rear wheel of the motorcycle is journaled. In addition, the support assembly is further adapted to be supported from the top portion of the rear fender of a motorcycle and includes opposite side portions disposed in horizontal planes and which project outwardly of opposite sides of the motorcycle to which the support assembly is secured. Still further, the support assembly additionally includes a rear horizontally disposed supporting section which, when the assembly is secured to a motorcycle, projects rearwardly from the bottom portion of the rear section of the associated motorcycle rear fender.

Although the support assembly alone may be utilized to support camping equipment and the like and have any such camping equipment which is to be carried thereby secured thereto by means of tie-down lines, the support assembly may further include a pair of pack boxes adapted to be supported from the opposite side laterally outwardly projecting portions of the support assembly and utilized to support and completely enclose various types of camping equipment and the like which may not be readily tied to the support assembly in a bundle.

The main object of this invention is to provide a motorcycle article support assembly including means adapted to be supported from the rear frame portions and fender of a motorcycle in a manner whereby a considerable load may be supported therefrom without affecting the balance of the motorcycle.

Still another object of this invention is to provide a motorcycle article support assembly including portions adapted to be secured to and to project laterally outwardly from opposite side portions of the rear wheel assembly of a motorcycle.

Another object of this invention, in accordance with the preceding object, is to provide a motorcycle article support assembly that may be readily secured to existing types of motorcycles.

A still further object of this invention is to provide a motorcycle article support assembly including a portion thereof adapted to project rearwardly from the lower portion of the rear fender of a motorcycle and to support various types of articles therefrom, the rearwardly projecting portion of the support assembly including a supplemental tail and stoplight combination adapted to be electrically connected to the conventional tail and stoplight assembly carried by the rear fender of the motorcycle to which the article support assembly is secured whereby the motorcycle may be provided with a tail and stoplight assembly which is not obscured by articles supported from the support assembly.

A final object of this invention to be specifically enumerated herein is to provide a motorcycle article support assembly constructed in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
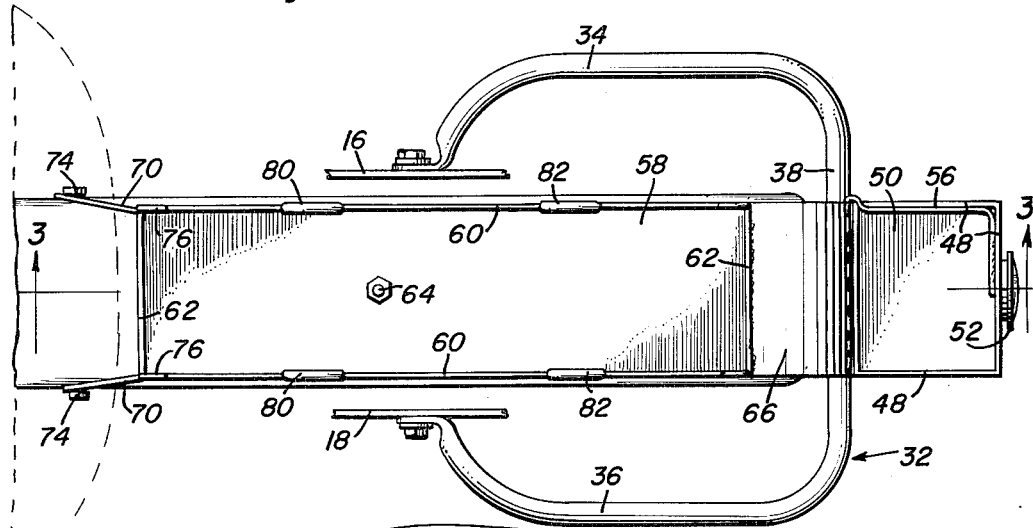
FIGURE 1 is a fragmentary top plan view of the rear portion of a motorcycle shown with the support assembly of the instant invention operatively connected thereto.

Referring now more specifically to the drawings the numeral 10 generally designates a motorcycle of conventional design including a main frame generally referred to by the reference numeral 14. The main frame 14 includes a pair of rearwardly projecting legs 16 and 18 between which a rear wheel assembly 20 is rotatably journaled. The motorcycle 10 further includes a rear fender assembly generally referred to by the reference numeral 22 which is secured to the frame 14 in any convenient manner at its forward end and to the rear ends of the legs 16 and 18 by means of V-shaped braces 24 and a rear brace 26.

Figure 2:
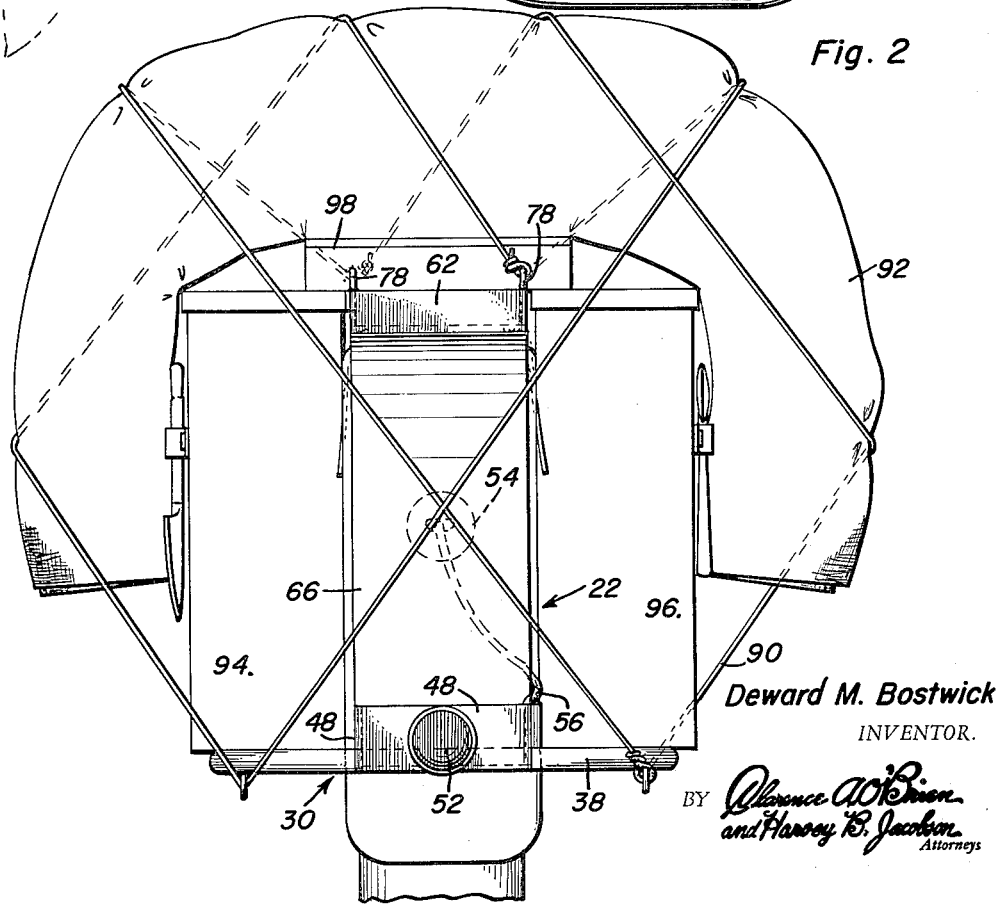
FIGURE 2 is a rear elevational view of the embodiment illustrated in FIGURE 1 and shown with a pair of pack boxes and various types of camping equipment supported from the article support assembly.
Figure 3:
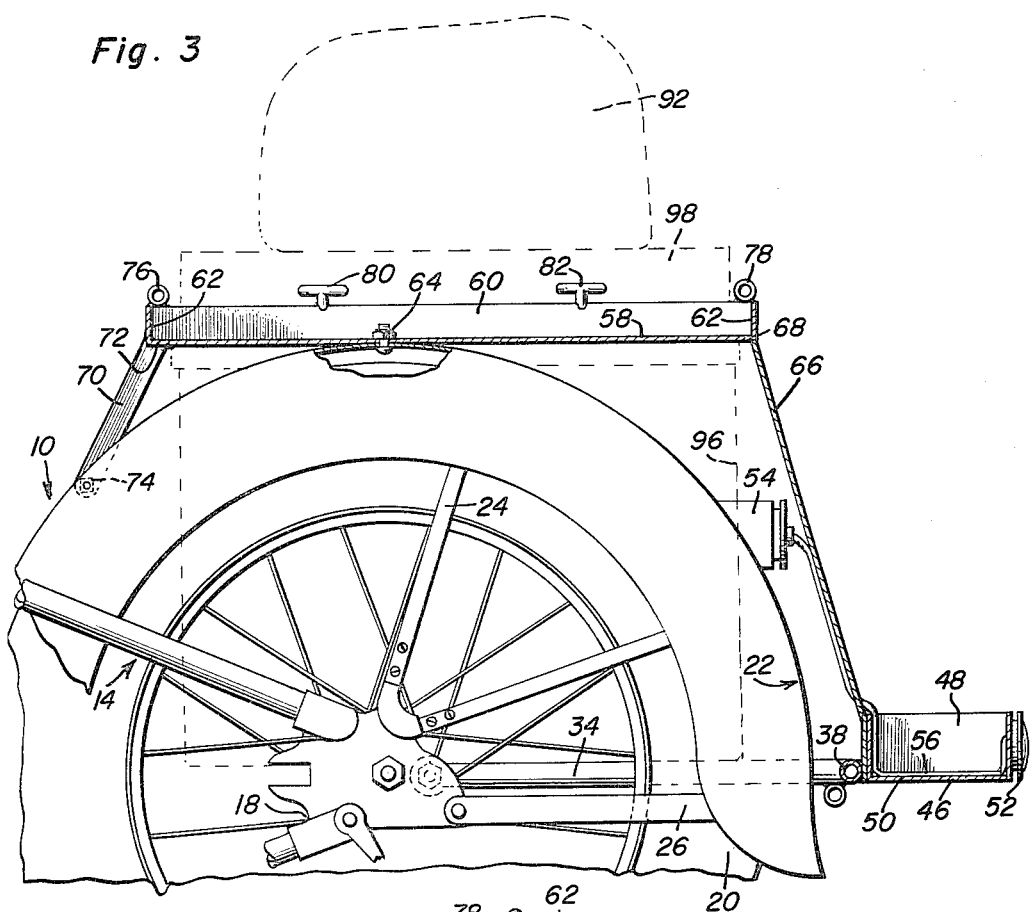
FIGURE 3 is a fragmentary longitudinal vertical sectional view taken substantially upon the plane indicated by the section line 3—3 of FIGURE 1.

The motorcycle article support assembly of the instant invention is generally referred to by the reference numeral 30 and includes a generally horizontally disposed C-shaped base referred to in general by the reference numeral 32. The base 32 includes a pair of generally parallel legs 34 and 36 interconnected at their rear ends by means of an integral bight portion 38. The free ends of the legs 34 and 36 converge toward each other and include generally parallel mounting portions 40 which are suitably apertured as at 42 for securement to the rear ends of the legs 16 and 18 by means of suitable fasteners 44. From FIGURES 1 and 2 of the drawings it will be seen that the C-shaped base is secured to the rear ends of the legs 16 and 18 adjacent the axis of rotation of the rear wheel assembly 20 and that the base 32 embraces the rear half of the wheel assembly 20. Further, the bight portion 38 extends across and behind the rear lower portion of the fender 22 and includes a rearwardly projecting generally horizontally disposed support member 46. The support member 46 includes four upstanding walls 48 interconnected at their lower ends by means of a bottom wall 50 and a tail and stoplight assembly 52 which is electrically connected to the conventional tail and stoplight assembly 54 carried by the fender 22 by means of insulated electrical conductors 56. It is to be understood that the end of the electrical conductors 56 adjacent the conventional tail and stoplight assembly 54 may be electrically connected thereto by means of any suitable male plug member that may be readily inserted in the socket of the stop and taillight assembly 54 in lieu of the bulb which is conventionally secured therein.

The support assembly 30 also includes a generally horizontally disposed and elongated platform 58 including pairs of upstanding opposite side and opposite end walls 60 and 62. The midportion of the platform 58 rests upon an upper portion of the fender 22 and is secured thereto by means of a suitable fastener 64. Further, a downwardly and rearwardly inclined rigid brace 66 is secured at its upper end to the rear of the platform 58 in any convenient manner such as by welding 68 and to the bight portion 38 and the support member 46 at its lower end. Still further, a pair of opposite side and forwardly and downwardly inclined rigid brace members 70 are secured to the bottom of the forward end of the platform 58 in any convenient manner such as by welding 72 at their upper ends and to opposite sides of the forward portion of the fender 22 in any convenient manner such as by fasteners 74 at their lower ends.

Figure 4:
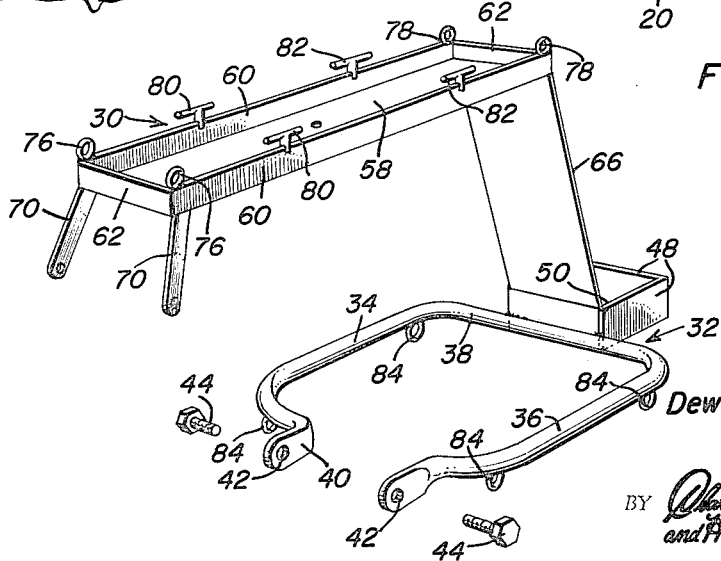
FIGURE 4 is a perspective view of the support assembly on somewhat of a reduced scale.

With attention now directed more specifically to FIGURE 4 of the drawings it may be seen that the support assembly 30 includes two pairs of line-securing anchors 76 and 78 at its opposite ends and a second pair of line-securing anchors 80 and 82 intermediate its opposite ends. Further, the legs 34 and 36 each have a pair of line-securing anchors 84 secured thereto at points spaced longitudinally there along. From FIGURE 2 of the drawings it may be seen that the line-securing anchors 76, 78 80, 82 and 84 may be utilized to secure various points spaced longitudinally along the line 90 to the support assembly 30 in order that the latter may be utilized to support various forms of rolled camping equipment 92 and any other equipment which may be disposed in the pack boxes 94 and 96 supported by the legs 34 and 36. The line 90 of course provides a means whereby the pack boxes 94 and 96 together with the rolled camping equipment 92 may be maintained in position on the article support assembly 30.

It is believed that it may be seen that considerable amounts of camping equipment and the like may be compactly supported on a motorcycle by using the article support assembly of the instant invention and that the load supported by the support assembly is evenly distributed on opposite sides of the longitudinal centerline of the motorcycle whereby the balance of the motorcycle is not adversely affected.

Further, the platform 58 and its opposite side and end walls 60 and 62 define an upwardly opening tray of a plan shape and area adapted to loosely receive a plurality of disjointed tent poles (not shown) with the poles disposed below the upper edges of said tray thereby enabling a camping stove 98 to rest upon the upper edges of the walls 60 and 62 and to form a cover for the tray.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a motorcycle of the type including a main frame having a pair of rearwardly projecting arms between whose rear ends a rear wheel is journaled and from which a downwardly opening rear fender embracing the upper peripheral portions of said wheel is supported, a motorcycle article support comprising a generally horizontally disposed frame-like base including a pair of generally parallel legs interconnected at one pair of corresponding ends by means of a bight portion, the free ends of said legs including means securing said legs to the rear end portions of the first mentioned arms adjacent the axis of rotation of said rear wheel and with said base embracing the rear half of said rear wheel and the bight portion thereof passing transversely of said rear wheel behind the latter and the lower rear portion of said fender, a generally horizontally disposed and elongated platform extending longitudinally of said fender and disposed above the latter, means securing an upper portion of said fender to an adjacent portion of said platform intermediate its opposite ends, rigid brace means secured between the rear end of said platform and said bight portion, said lower rear portion of said fender including a first stop and tail light assembly which projects rearwardly of said fender, said rigid brace means including portions disposed in horizontal alignment with said assembly and spaced rearwardly thereof, said bight portion including means defining a rearwardly projecting generally horizontally disposed support member, said support member including a second stop and tail light assembly on its rear end portion electrically connected to said first stop and tail light assembly supported from said lower rear portion of said fender forwardly of said brace means.

2. The combination of claim 1 wherein said motorcycle support includes pairs of opposite side line-securing anchors disposed at points spaced longitudinally of said platform, and longitudinally of said legs.

3. The combination of claim 1 including a pair of opposite side pack boxes supported on opposite sides of said wheel and fender and from said legs with the bottoms of said pack boxes resting upon the upper surfaces of said legs.

4. The combination of claim 1 wherein said platform includes upstanding opposite side and end walls and is of a plan size and shape adapted to receive a plurality of disjointed tent poles therein with the latter disposed below the upper edges of said walls whereby a camp stove or the like may be supported from the upper edges of said side walls and comprise a closure for the tray formed by said platform and its upstanding side walls.

5. In combination with a motorcycle of the type including a main frame having a pair of rearwardly projecting arms between whose rear ends a rear wheel is journaled and from which a downwardly opening rear fender embracing the upper peripheral portions of said wheel is supported, a motorcycle article support comprising a generally horizontally disposed frame-like base including a pair of generally parallel legs interconnected at their one pair of corresponding ends by means of a bight portion, the free ends of said legs being inwardly directed toward each other and including means securing said legs to the rear end portions of said arms adjacent the axis of rotation of said rear wheel and with said base embracing the rear half of said rear wheel and the bight portion thereof passing transversely of said rear wheel behind the latter and the lower rear portion of said fender, said legs being spaced outwardly of parallel planes extending longitudinally of said motorcycle and containing the opposite side extremities of said rear fender, a generally horizontally disposed and elongated platform extending longitudinally of said fender and disposed above the latter, means securing an upper portion of said fender to an adjacent portion of said platform intermediate its opposite end rigid brace means secured between the rear end of said platform and said bight portion, a pair of opposite side load containing receptacles supported on opposite sides of said wheel and fender and from said legs with the lower portions of said receptacles being supported from said legs with the latter extending behind the lower ends of said receptacles.

References Cited by the Examiner

UNITED STATES PATENTS 579,753  3/1897  Henkel _____ 224—32

FOREIGN PATENTS 83,295  8/1957  Denmark.
849,294  8/1939  France.
603,012  6/1948  Great Britain.

GERALD M. FORLENZA, *Primary Examiner.*

HUGO O. SCHULZ, *Examiner.*